(No Model.) 2 Sheets—Sheet 1.
N. C. STILES.
CLUTCH MECHANISM FOR POWER PRESSES.
No. 471,777. Patented Mar. 29, 1892.
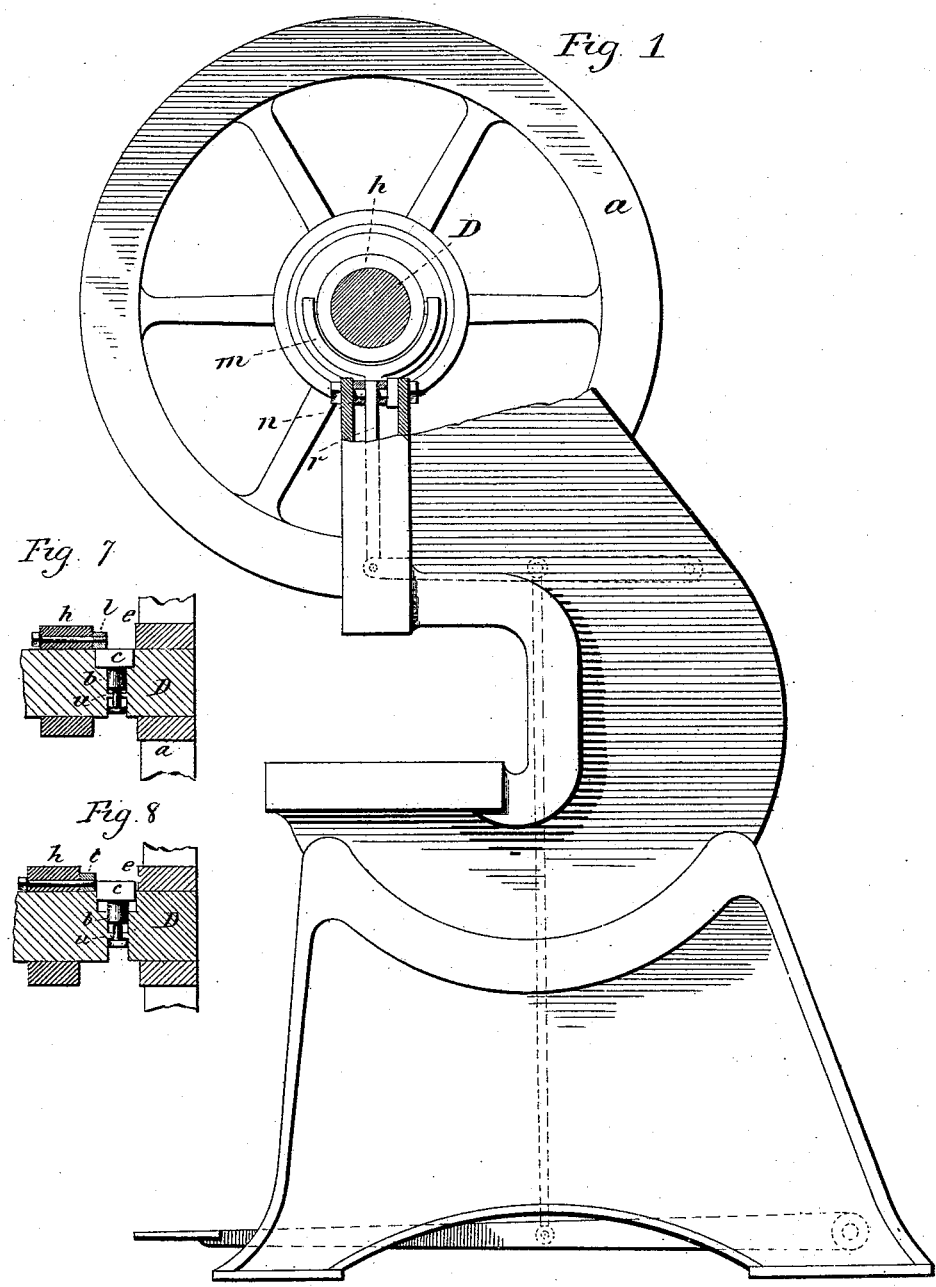

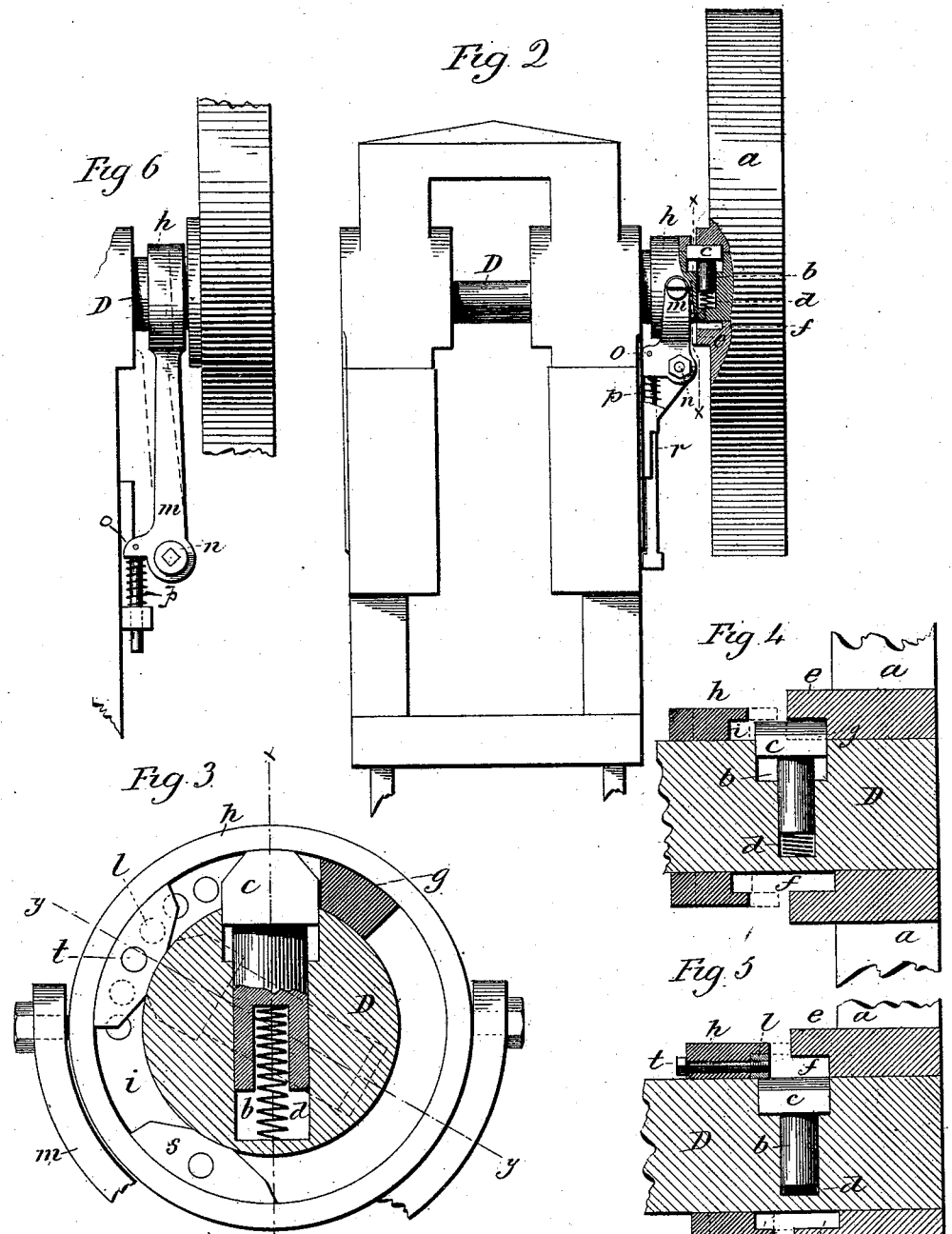

UNITED STATES PATENT OFFICE.

NORMAN C. STILES, OF MIDDLETOWN, CONNECTICUT.

CLUTCH MECHANISM FOR POWER-PRESSES.

SPECIFICATION forming part of Letters Patent No. 471,777, dated March 29, 1892.

Application filed November 9, 1891. Serial No. 411,357. (No model.)

*To all whom it may concern:*

Be it known that I, NORMAN C. STILES, of Middletown, in the county of Middlesex and State of Connecticut, have invented a new Improvement in Clutch Mechanisms for Power-Presses; and I do hereby declare the following, when taken in connection with accompanying drawings and the letters of reference marked thereon, to be a full, clear, and exact description of the same, and which said drawings constitute part of this specification, and represent, in—

Figure 1, a side view of the press, parts in section or broken away to illustrate the invention; Fig. 2, a front view of the upper portion of the press, parts in section, illustrating the clutching mechanism, the slide of the press being omitted; Fig. 3, a transverse section cutting through the shaft on line $x\,x$ of Fig. 1, enlarged; Fig. 4, a longitudinal central section on line $x\,x$ of Fig. 3, on a scale of half the size of Fig. 3; Fig. 5, a longitudinal section cutting on line $y\,y$ of Fig. 3, with the shaft in the position indicated in broken lines, Fig. 3; Fig. 6, a modification in the mechanism for moving the collar; Figs. 7 and 8, modifications.

This invention relates to an improvement in power-presses, and especially to the clutch mechanism by which the power is thrown into engagement with the driving-shaft for the operation of the press, the object being to adapt the press to stop at more than one point in a single rotation instead of only in the up position, as in the usual construction, both for convenience in working the press and to avoid accidents, which frequently occur in use of a press capable of stopping only at the extreme point of elevation.

With these objects in view the invention consists in the construction as hereinafter described, and particularly recited in the claims.

The wheel $a$, through which the power is communicated to the press, is arranged loosely upon the shaft D, as usual in this class of presses, and so that it may receive a continuous revolution, it being designed to connect the shaft with the said wheel whenever the operation of the press is desirable. In a diametrical recess $b$ in the shaft D a bolt $c$ is arranged. This bolt is supported in the said recess upon a spring $d$, the tendency of which is to force the bolt outward. A portion of the head of the bolt stands within the hub $e$ of the wheel $a$; but a portion of the head projects from the hub toward the body of the press. The hub is constructed with a concentric recess $f$, within which the head of the bolt may work; but the said recess is constructed with one or more inwardly-projecting lugs $g$, one only being represented in Fig. 3 and in broken lines, Fig. 4, and which lug when the stud is projecting from the shaft will strike the said stud, as seen in Figs. 3 and 4, and thus engage the wheel $a$ with the shaft, so that the shaft must partake of the rotation of the said wheel so long as the said engagement is maintained; but if the stud be forced into the shaft, as represented in broken lines, Fig. 3, and also seen in Fig. 5, then the lug will escape the said stud and rotation of the shaft with the wheel will be accordingly prevented. If more than one lug be employed, they should be arranged equidistant. The employment of more than one lug simply permits engagement with the power at different points in each revolution of the pulley instead of at one point only, as must be the case where a single lug is employed. Consequently when more than one lug is employed the press will naturally start quicker when the clutching mechanism is thrown into active position, as by depressing the pedal. To automatically throw the said stud out of engagement with the said lug at a predetermined point, a collar $h$ is arranged on the shaft and so as to slide longitudinally on the shaft. This collar is constructed with a concentric recess $i$ in its face toward the bolt, as seen in Figs. 3 and 4, the diameter of which corresponds to the path naturally traveled by the end of the bolt when projecting from the shaft, as represented in Figs. 3 and 4, so that the said collar may be forced toward the wheel and bring the said recess over the end of the bolt, as represented in broken lines, Fig. 4, and as also seen in Fig. 5. When the collar stands in this position, the bolt, if unobstructed, is free to travel within that recess in the collar; but at one point in the said recess a cam-block $l$ is arranged extending inward to the surface of the shaft, (see Fig. 3,) so that when the bolt reaches this block (it being understood that the collar is prevented from revolving with the shaft) the block presents an inclined surface to the end of the bolt and so as to operate as a cam upon the face of the bolt to force the bolt inward as it advances, as represented in broken lines, Fig. 3. This block or cam $l$ brings the face of the bolt flush with the surface of the shaft and takes the bolt out of engagement with the wheel, so that so soon as the bolt is thus forced inward the press will stop, yet the wheel may continue its revolution. This block or cam is arranged so that the bolt may be forced inward and free from the wheel when the slide stands in its up position. If the momentum of the press were sufficient to carry the bolt beyond the said cam or block $l$, the bolt would of course then be thrown outward by its own spring and ready to engage the wheel as the lug $g$ in the next revolution came into contact with the said bolt. To prevent the natural result from such overthrow of the shaft, the collar is given a further longitudinal movement toward the wheel, as indicated in broken lines, Fig. 5, so that the portion of the collar back of the recess will pass on over the bolt and so that the bolt then will run within the body of the collar, which is of the same diameter as the shaft, and will then be held against possible projection so long as the collar be retained in that locking or outward position. Then when it is required to start the press it is only necessary to withdraw the collar, as represented in Fig. 4. The bolt is immediately projected and engages the wheel, as before.

The collar $h$, as represented in Fig. 2, is operated by a forked lever $m$, hung upon a pivot $n$, so as to swing in the plane of the axis of the shaft, and secured to the collar, so as to prevent the rotation of the collar. As represented in Fig. 6, the lever $m$ is of the bell-crank character. The second arm $o$, projecting inward, rests upon a spring $p$, the tendency of which is to force the collar outward and into its locking position and hold it in that position to prevent the engagement of the wheel with the shaft. To withdraw the collar, connection is made through a rod $r$ to the arm $o$ of the said lever, so that by pulling down upon the said rod $r$ the collar will be thrown backward out of the path of the bolt, as represented in broken lines, Fig. 6, and this operation is best produced by means of a pedal $u$, in connection with the said rod, as seen in Fig. 1, as usual for the operation of the clutch mechanism in this class of presses.

Instead of connecting the collar with the lever by a fork, as I have described, it may be made a part of the arm $m$ of the same bell-crank lever as represented in Fig. 6, and so as to be moved back and forth by the swing of the said lever, as indicated in broken lines in said Fig. 6, the rocking movement of the collar under such operation being so slight as not to affect the operation.

It is often desirable to stop the press as the punch is approaching the die or at some other point than the up position. To accomplish this result, a second cam $s$ is arranged in the recess $i$ in the collar, this cam being substantially like the cam $l$, before described, and arranged at a point to operate upon the bolt where such stopping of the press is desirable. This second stop is useful to avoid accidents, which frequently occur after the slide of the press has commenced its descent, under the usual construction it being impossible to stop the press until it has returned again to the up position, whereas with this intermediate stop the operation of the press may be interrupted at any desired point by setting the cam $s$ at the required point to so interrupt the operation of the press, and this point may be such as to prevent the accidents referred to, it only being necessary that the operator shall release the collar after the press starts and before the said second cam is reached.

In the operation of the first stop—that is, in the up position—if the press is running very rapidly the momentum will naturally carry the shaft beyond the position where disengagement of the shaft from the power actually occurs, and this momentum will be greater according as the velocity with which the press runs is greater, and under such great velocity the shaft is carried beyond its dead-center. To overcome this difficulty and insure the stopping of the press at the up position, the cam-block $l$ is made adjustable circumferentially in the recess $i$ of the collar. As here represented, this cam-block $l$ is made separate from the collar and secured in its place by a screw $t$, (see Fig. 5,) the screw extending through the collar into the cam-block. A series of holes may be made through the collar, as represented in Fig. 3, so that said collar may be set at either of the positions by inserting the screw through into one of the said holes, according to the position desired for the block, and so as to make the disengagement sooner or later, as the case may be. The stop $s$ may also be made adjustable in like manner to vary its position so as to change the stopping of the press, which it would produce accordingly.

This clutch mechanism, it will be understood, is applicable to all power-presses in which the power is applied to the shaft in substantially the manner as herein described.

The cam-blocks may be made circumferentially adjustable in the collar without the necessity of forcing the body of the collar over the bolt, as I have described—that is to say, these adjustable blocks may be employed in the usual clutch mechanism of this class of presses.

While I prefer to recess the adjacent faces of the hub of the driving-wheel and of the collar $h$, as I have described, and so as to bring the lug $g$ of the wheel and the cams of the collar within the said recesses, the faces of the two may be made flush, as seen in Figs. 7 and 8, with the lug $g$ on the wheel in the same relation as in the first description, and the cams, as $l$, arranged on the face of the collar; but in such construction some provision is necessary to prevent the bolt $c$ from being thrown out of the shaft. Such construction is illustrated in Figs. 7 and 8. The bolt is arranged radially in the shaft and with a spring, so as to throw the bolt outward. The spindle of the bolt extends through a bridge $u'$, with a head upon the reverse side, so as to limit the outward movement of the bolt and yet permit the bolt to be forced inward, as indicated in Fig. 8. In this construction the collar will be moved forward first to bring the cam-lug $l$ into the path of the bolt, as seen in broken lines, Fig. 7, so that the bolt will be thrown inward, as seen in Fig. 8, and then the forward movement of the collar is completed, so as to bring the body of the collar over the head of the bolt when so forced into the shaft to hold it in that withdrawn position, substantially as first described.

I claim—

1. In a power-press in which the slide is operated from a shaft, the combination therewith of a driving-wheel loose upon the shaft, a radial spring-bolt in the shaft inside the face of the hub of the wheel, the hub of the wheel provided with a lug in the path of said spring-bolt when projecting from the shaft, a collar arranged to slide longitudinally on the shaft toward and from the hub of the wheel, the collar provided with one or more cam-blocks on its face side, projecting toward the hub of the wheel and adapted to be thrown into the path of the said bolt when projecting, and mechanism, substantially such as described, for imparting said longitudinal movement to said collar, substantially as described.

2. In a power-press in which the slide is operated from a shaft, the combination therewith of a driving-wheel loose upon the shaft, the said driving-wheel constructed with a concentric recess around the shaft and provided with a lug in said recess, projecting toward the shaft, a spring-bolt arranged radially in said shaft and within said recess in the hub of the wheel, the said bolt projecting longitudinally from the said recess, a collar arranged to slide on the shaft toward and from said recess, the collar constructed with a concentric recess upon its face toward the wheel, the depth of the said recess in the collar being less than said projection of the bolt, and the said recess in the collar provided with one or more cam-blocks extending inward to the surface of the shaft on which the collar slides, and mechanism, substantialy such as described, for imparting longitudinal movement to said collar, substantially as and for the purpose described.

3. In a power-press in which the slide is operated from a shaft, the combination therewith of a driving-wheel loose upon the shaft, said wheel constructed with a concentric recess around the shaft, with a lug in said recess projecting toward the shaft, a spring-bolt arranged radially in the shaft and within the plane of the said recess in the hub of the wheel, the head of the bolt projecting longitudinally from the said recess in the hub, a collar arranged to slide on the shaft toward and from said recess in the wheel, the said collar constructed with a concentric recess upon its face toward the wheel, one or more cam-blocks in said recess in the collar and adapted to engage and force the said bolt inward when the recess in the collar is passed over the head of the bolt, said cam-blocks made circumferentially adjustable in the recess of the collar, and mechanism, substantially such as described, for imparting longitudinal movement to said collar, substantially as and for the purpose described.

In testimony whereof I have signed this specification in the presence of two subscribing witnesses.

NORMAN C. STILES.

Witnesses:
JOHN E. EARLE,
FRED. C. EARLE.